United States Patent
Pyper et al.

(10) Patent No.: US 8,146,399 B2
(45) Date of Patent: Apr. 3, 2012

(54) MODULAR SPRING RETAINER AND METHOD FOR METAL FORMING DIES AND THE LIKE

(75) Inventors: Joel T. Pyper, Grand Rapids, MI (US); Scott M. Breen, Grand Rapids, MI (US)

(73) Assignee: Standard Lifters, Inc., Grand Rapids, MI (US)

( * ) Notice: Subject to any disclaimer, the term of this patent is extended or adjusted under 35 U.S.C. 154(b) by 703 days.

(21) Appl. No.: 12/322,471

(22) Filed: Feb. 3, 2009

(65) Prior Publication Data

US 2009/0193951 A1    Aug. 6, 2009

Related U.S. Application Data

(60) Provisional application No. 61/063,494, filed on Feb. 4, 2008.

(51) Int. Cl.
*B21D 43/05*    (2006.01)

(52) U.S. Cl. ............ 72/420; 72/405.06; 72/421; 83/588; 29/428

(58) Field of Classification Search ............... 83/277, 83/387, 588; 72/393, 405.1, 405.06, 420, 72/421, 453.13; 29/428
See application file for complete search history.

(56) References Cited

U.S. PATENT DOCUMENTS

| | | | |
|---|---|---|---|
| 2,979,004 A | 4/1961 | Kenville et al. | |
| 3,804,265 A * | 4/1974 | Charnota et al. | 83/387 |
| 4,031,787 A * | 6/1977 | Cady | 83/588 |
| 4,282,736 A | 8/1981 | Mashburn | |
| 4,326,402 A * | 4/1982 | Wallis | 72/420 |
| 4,553,445 A * | 11/1985 | Holbrook et al. | 83/227 |
| 4,575,937 A * | 3/1986 | McCullough | 83/286 |
| 4,993,295 A * | 2/1991 | Dacey, Jr. | 83/140 |
| 5,243,743 A | 9/1993 | Peterson | |
| 5,706,696 A * | 1/1998 | Wagner | 72/351 |
| 5,974,852 A | 11/1999 | Nieschulz | |
| 6,848,290 B2 * | 2/2005 | Pyper et al. | 72/405.06 |
| 6,895,797 B2 | 5/2005 | Lowry et al. | |
| 7,021,113 B1 * | 4/2006 | Peterson et al. | 72/420 |
| 7,152,451 B1 | 12/2006 | Cotter | |
| 2009/0193951 A1 * | 8/2009 | Pyper et al. | 72/405.01 |

* cited by examiner

*Primary Examiner* — David Jones

(74) *Attorney, Agent, or Firm* — Price Heneveld LLP

(57) ABSTRACT

A modular spring retainer and method for metal forming dies includes a base shaped for detachable connection with an associated die plate, having a threaded central aperture, and an adjacent lock dowel aperture which extends through the threaded central aperture to form a window. A cylindrically-shaped spring retainer is configured to receive a spring therein, and has a threaded exterior portion which engages the threaded central aperture of the base, such that mutual rotation of the same adjusts the longitudinal position of the spring. A locking dowel is closely received in the lock dowel aperture in the base, and has an unthreaded exterior surface which protrudes through the window and abuttingly engages an adjacent portion of the threaded exterior surface of the spring retainer to securely, yet detachably, retain the spring member in a selected longitudinal position.

25 Claims, 4 Drawing Sheets

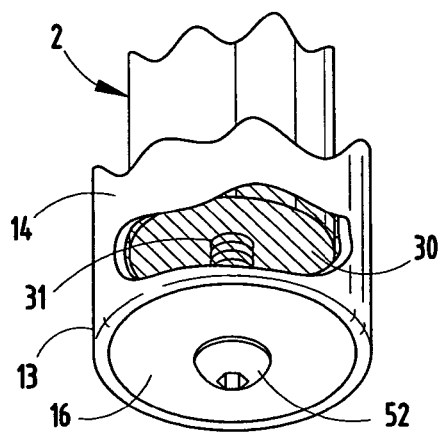
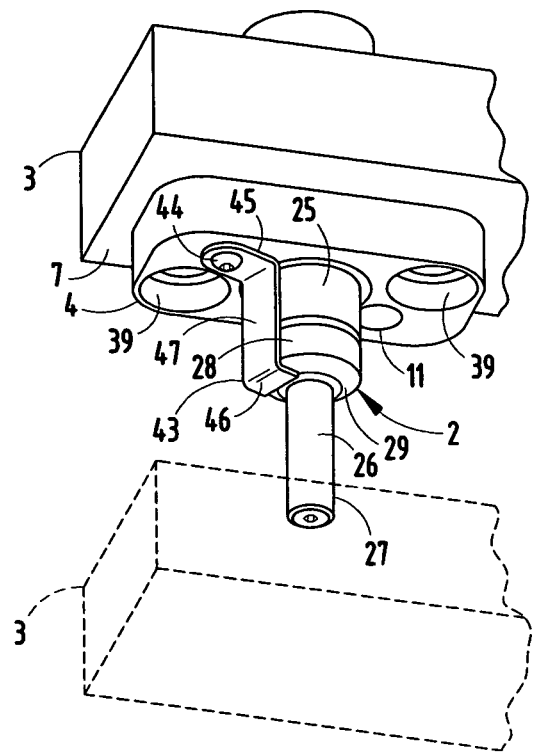
FIG. 10
FIG. 11
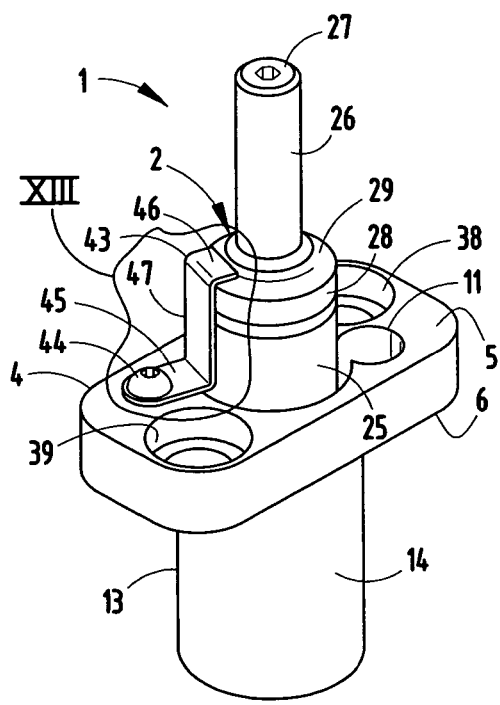
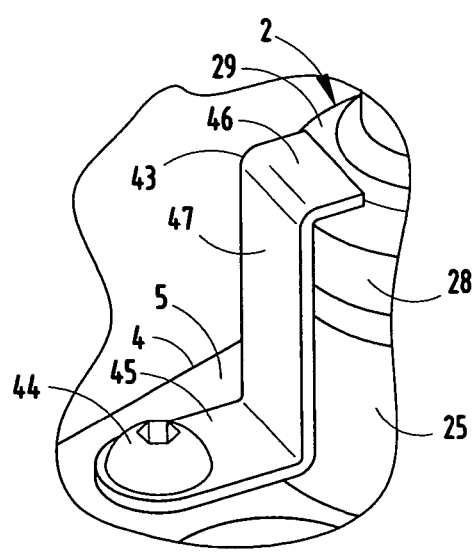
FIG. 12
FIG. 13

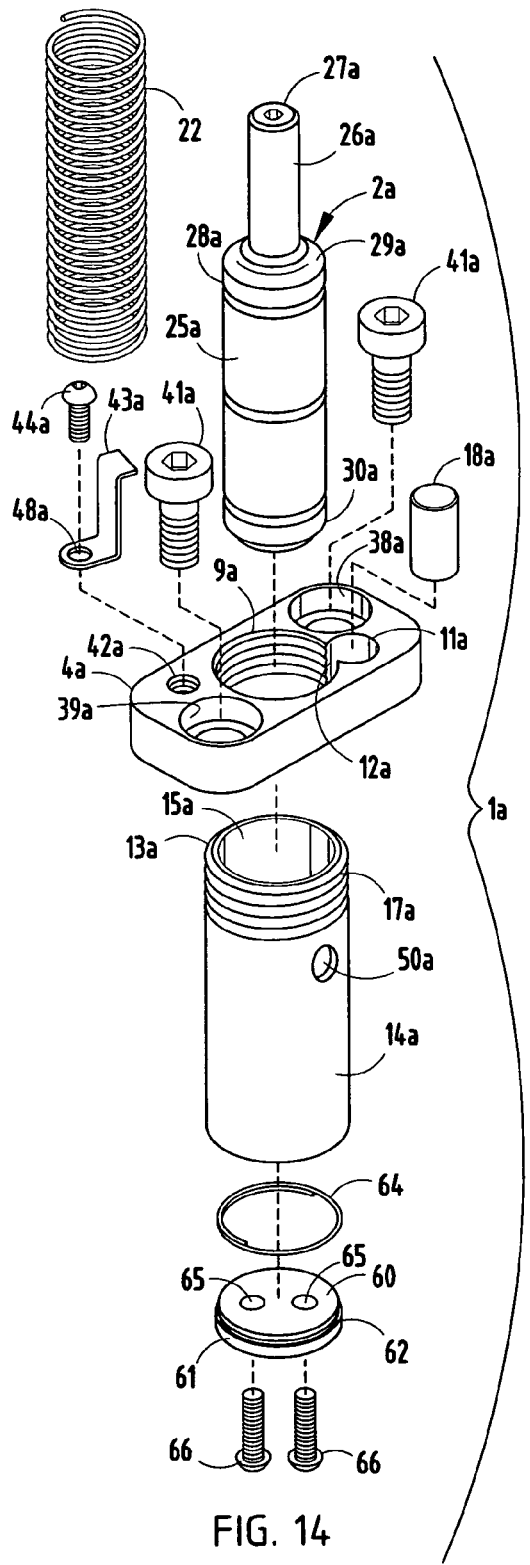
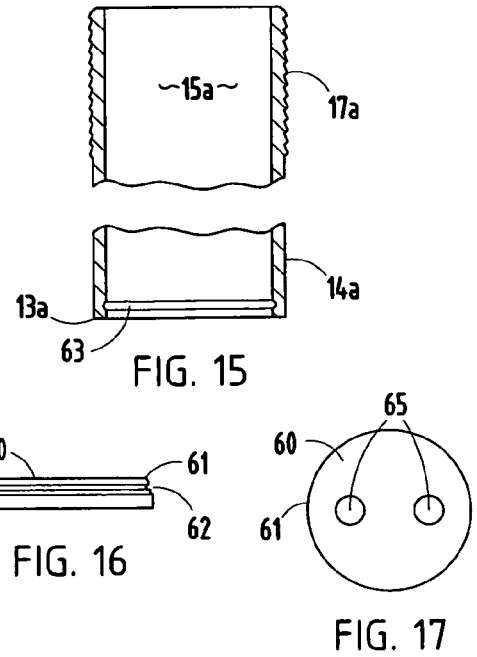
FIG. 15
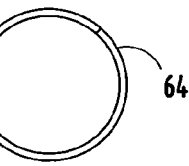
FIG. 16
FIG. 17
FIG. 18
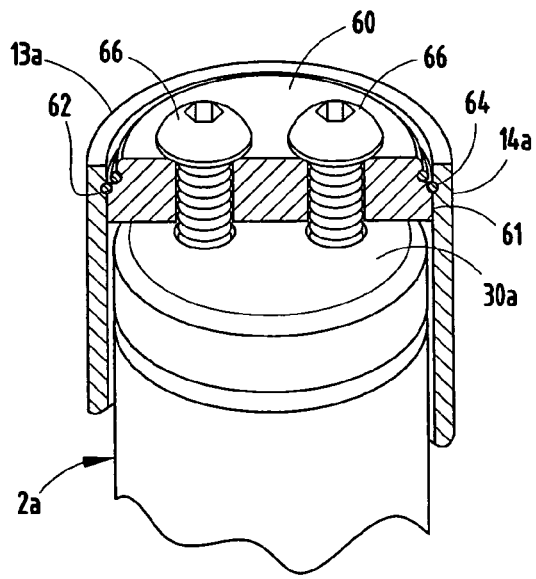
FIG. 14
FIG. 19

MODULAR SPRING RETAINER AND METHOD FOR METAL FORMING DIES AND THE LIKE

CLAIM OF PRIORITY

Applicants hereby claim the priority benefits under the provisions of 35 U.S.C. §119, basing said claim of priority on related Provisional Patent Application Ser. No. 61/063,494, filed Feb. 4, 2008.

BACKGROUND OF THE INVENTION

The present invention relates to metal forming dies and the like, and in particular to a modular spring retainer and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one of a kind assemblies for a particular part, with each of the various components being handcrafted and custom mounted or fitted in an associated die set, which is in turn positioned in a stamping press. Not only are the punches and other forming tools in the die set individually designed and constructed, but the other parts of the die set, such as stock lifters, guides, end caps and keepers, cam returns, etc., are also custom designed, and installed in the die set. Current die making processes require carefully machined, precision holes and recesses in the die set for mounting the individual components, such that the same are quite labor intensive, and require substantial lead time to make, test and set up in a stamping press. Examples of prior art die spring assemblies which require precise machining to mount the same in an associated die plate are illustrated in FIG. 1. Such metal forming dies are therefore very expensive to design, manufacture and repair, or modify.

Consequently, a modular spring retainer of the type disclosed herein would be clearly advantageous in simplifying metal forming die constructions and reducing the cost in designing, manufacturing and repairing the same.

SUMMARY OF THE INVENTION

One aspect of the present invention is a metal forming die of the type having first and second die plates mounted in a spaced apart relationship for mutual reciprocation between converged and diverged positions, and a spring member disposed operatively between the first and second die plates for biasing the same to the diverged position. A modular spring retainer detachably mounts the spring member on the first die plate. The modular spring retainer includes a base having a first face, a second face shaped to abut an adjacent face of the first die plate, a connector portion for detachably mounting the base to the first die plate, a central aperture extending axially through the base and including a threaded interior surface, and a lock dowel aperture extending axially through the first face of the base at a location laterally adjacent to the central aperture, such that the lock dowel aperture forms a window through the threaded interior surface of the central aperture and communicates with the central aperture. An elongate, cylindrically-shaped spring retainer has a housing portion with a hollow interior closely receiving the spring member therein, an end cap portion abuttingly supporting thereon an associated end of the spring member, and a threaded exterior portion which threadedly engages the threaded interior surface of the central aperture in the base, whereby rotation of the spring retainer relative to the base adjusts the longitudinal position of the spring member with respect to the first die plate. A locking dowel is closely received in the lock dowel aperture in the base and has an unthreaded exterior portion which protrudes through the window in the central aperture of the base and abuttingly engages an adjacent portion of the threaded exterior surface of the spring retainer to securely, yet detachably, retain the spring member in a selected longitudinal position relative to the first die plate.

Another aspect of the present invention is a modular spring retainer for metal forming dies of the type having first and second die plates mounted in a spaced apart relationship for mutual reciprocation between converged and diverged positions, and a spring member disposed operatively between the first and second die plates for biasing the same to the diverged position. The modular spring retainer includes a base having a first face, a second face shaped to abut an adjacent face of the first die plate, a connector portion for detachably mounting the base to the first die plate, a central aperture extending axially through the base and including a threaded interior surface, and a lock dowel aperture extending axially through the first face of the base at a location laterally adjacent to the central aperture, such that the lock dowel aperture forms a window through the threaded interior surface of the central aperture and communicates with the central aperture. An elongate, cylindrically-shaped spring retainer has a housing portion with a hollow interior closely receiving the spring member therein, an end cap positioned abuttingly supporting thereon an associated end of the spring member, and a threaded interior portion which threadedly engages the threaded interior surface of the central aperture in the base, whereby rotation of the spring retainer relative to the base adjusts the longitudinal position of the spring member with respect to the first die plate. The locking dowel pin is closely received in the lock dowel aperture in the base, and has an unthreaded exterior surface portion which protrudes through the window in the central aperture of the base and abuttingly engages an adjacent portion of the threaded exterior surface of the spring retainer to securely, yet detachably, retain the spring member in a selected longitudinal position relative to the first die plate.

Yet another aspect of the present invention is a method for making a metal forming dies of the type having first and second die plates mounted in a spaced apart relationship for mutual reciprocation between converged and diverged positions, and a spring member disposed operatively between the first and second die plates for biasing the same to the diverged position. The method includes forming a base with a first face, a second face shaped to abut an adjacent face of the first die plate, a connector portion for detachably mounting the base to the first die plate, a central aperture extending axially through the base and including a threaded interior surface, and a lock dowel aperture extending axially through the first face of the base at a location laterally adjacent to the central aperture, such that the lock dowel aperture forms a window through the threaded interior surface of the central aperture and communicates with the central aperture. The method further includes positioning the second face of the base abuttingly against the adjacent face of the first die plate, and detachably, yet securely, connecting the base with the first die plate. The method also includes forming an elongate, cylindrically-shaped spring retainer having a housing portion with a hollow interior closely receiving the spring member therein, an end cap positioned abutting supporting thereon an associated end of the spring member, and a threaded exterior portion. The method further includes threadedly engaging the threaded exterior portion of the spring retainer with the threaded interior surface of the central aperture in the base, whereby rotation of the spring retainer relative to the base adjusts the longitudinal position of the spring member with respect to the first die plate. The method also includes forming a locking dowel with an unthreaded exterior portion. The method also includes inserting the locking dowel pin in the lock dowel aperture in the base, such that the unthreaded exterior surface portion of the locking dowel pin protrudes through the window in the central aperture of the base and abuttingly engages an adjacent portion of the threaded exterior surface of the spring retainer to securely, yet detachably, retain the spring member in the selected longitudinal position relative to the first die plate.

Yet another aspect of the present invention is a spring retainer for metal forming dies having a modular construction which avoids the need for precise machining of the associated die plate to mount the same thereon. The modular spring retainer is constructed such that the rod end of the spring can be easily adjusted to any height above the mounting surface through the use of a threaded housing construction. The modular spring retainer includes a dowel pin which locks the associated housing in place to prevent the same from loosening inadvertently. The modular spring retainer has a standardized construction which eliminates costly labor and materials, is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 10 is a fragmentary perspective view of the modular spring retainer, with a portion thereof broken away to reveal internal construction.

FIG. 11 is a perspective view of the modular spring retainer, shown mounted in an upper die plate.

FIG. 12 is a perspective view of the modular spring retainer, shown in an assembled condition with a spring member.

FIG. 13 is an enlarged view of that portion of the modular spring retainer shown in the circle of FIG. 12.

FIG. 14 is an exploded perspective view of another embodiment of the modular spring retainer.

FIG. 15 is a fragmentary cross-sectional view of a housing portion of the modular spring retainer shown in FIG. 14.

FIG. 16 is a side elevational view of an end cap portion of the modular spring retainer shown in FIGS. 14-15.

FIG. 17 is a bottom plan view of the end cap shown in FIG. 16.

FIG. 18 is a plan view of a spring connector for the modular spring retainer shown in FIGS. 14-17.

FIG. 19 is a fragmentary perspective view of the modular spring retainer shown in FIGS. 14-18, wherein portions thereof have been broken away to reveal internal construction.

DETAILED DESCRIPTION OF THE PREFERRED EMBODIMENTS

Figure 1:
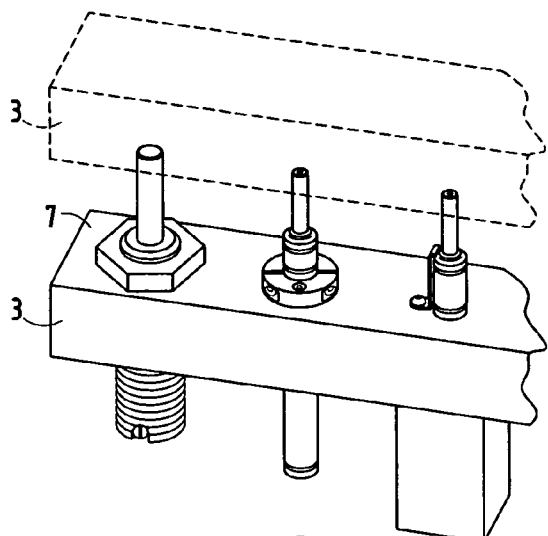
FIG. 1 is a fragmentary perspective view of three prior art springs mounted between associated die plates.
Figure 2:
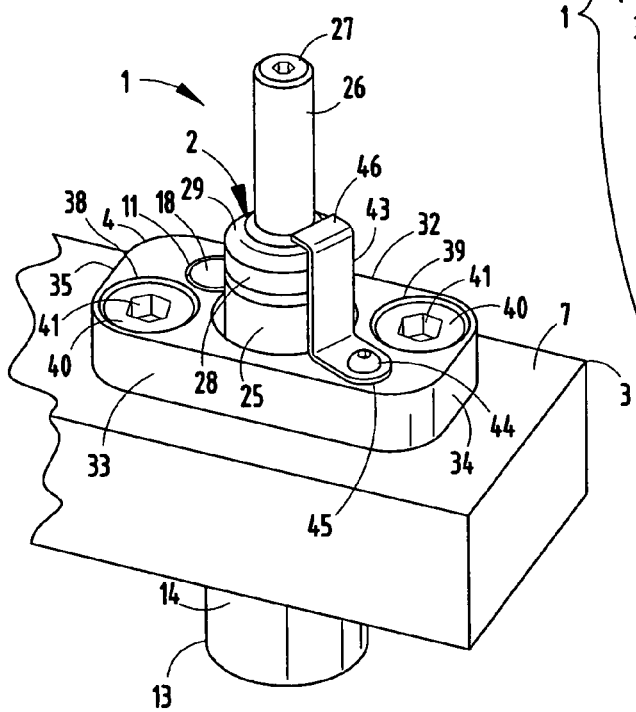
FIG. 2 is a perspective view of the modular spring retainer embodying the present invention, shown mounted in an associated die plate.
Figure 3:
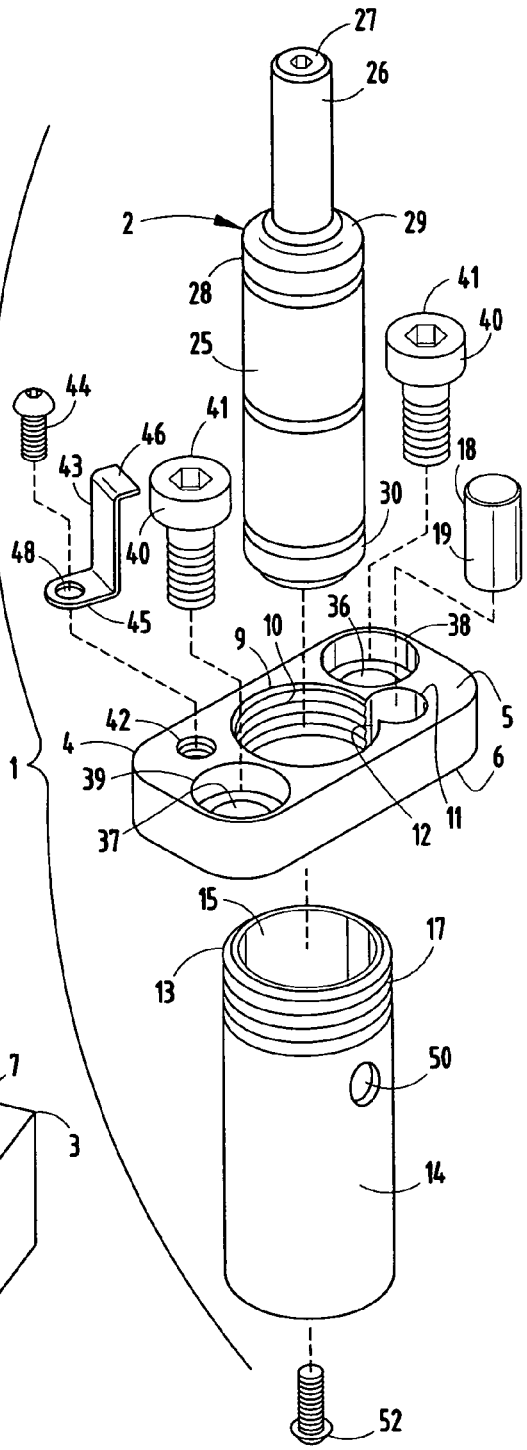
FIG. 3 is an exploded perspective view of the modular spring retainer shown in FIG. 2.
Figure 4:
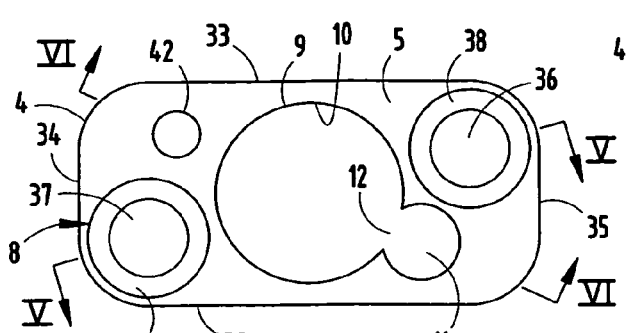
FIG. 4 is a top plan view of a base portion of the modular spring retainer.
Figure 6:
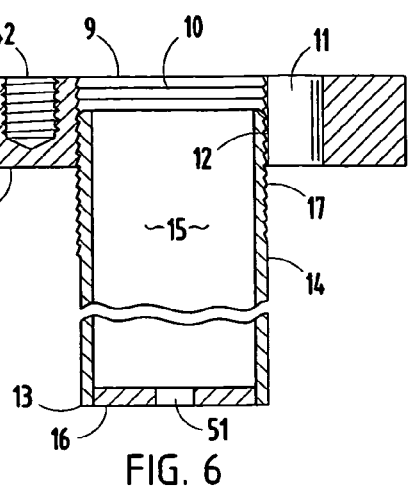
FIG. 6 is a cross-sectional view of the modular spring retainer shown in FIG. 4, taken along the line VI-VI, FIG. 4.

For purposes of description herein, the terms "upper", "lower", "right", "left", "rear", "front", "vertical", "horizontal" and derivatives thereof shall relate to the invention as oriented in FIGS. 2 and 3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 2-13) generally designates a modular spring retainer embodying the present invention. Modular spring retainer 1 is particularly adapted for use in conjunction with metal forming dies of the type having first and second die plates mounted in a spaced apart relationship for mutual reciprocation between converged and diverged positions, and a spring member 2 disposed operably between the first and second die plates for biasing the same to the diverged position. In the illustrated example, modular spring retainer 1 is shown mounted in an associated die plate 3 of the type used for form pads, stripper pads, lifter bars, etc. in metal stamping dies. Modular spring retainer 1 includes a base 4 having a first face 5, a second face 6 shaped to abut an adjacent face 7 of die plate 3, a connector portion 8 for detachably mounting base 4 to die plate 3, a central aperture 9 which extends axially through base 4 and includes a threaded interior surface 10, and a lock dowel aperture 11 extending axially through the first face 5 of base 4 at a location laterally adjacent to the central aperture 9, such that lock dowel aperture 11 forms a window 12 through the threaded interior surface 10 of central aperture 9 and communicates with central aperture 9. An elongate, cylindrically-shaped spring retainer 13 has a housing portion 14 with a hollow interior 15 receiving spring member 2 therein, an end cap portion 16 abuttingly supporting thereon an associated end of spring member 2, and a threaded exterior portion 17 which threadedly engages the threaded interior surface 10 of central aperture 9 in base 4, such that rotation of spring retainer 13 relative to base 4 adjusts the longitudinal position of spring member 2 with respect to die plate 3. A locking dowel pin 18 is closely received in lock dowel aperture 11 in base 4 and has an unthreaded exterior surface portion 19 which protrudes through the window 12 in the central aperture 9 of base 4 and abuttingly engages an adjacent portion of the threaded exterior surface 17 of spring retainer 13 to securely, yet detachably, retain spring member 2 in a selected longitudinal position relative to die plate 3.

In the example illustrated in FIGS. 2-13, spring member 2 is a conventional gas spring of the type having a cylindrical housing 25 containing pressurized gas therein, and a reciprocating rod 26 that is connected to a piston (not shown) mounted within housing 25. Gas spring 2 has a normally fully extended position, and the outer end 27 of rod 26 is typically positioned abuttingly against an adjacent die plate 3 to resiliently urge the die plate into its fully diverged position. The rod end 28 of housing 25 includes a radially extending shoulder 29, and the housing end 30 (FIGS. 8 and 10) of housing 25 may include a threaded mounting aperture 31 for purposes to be described in greater detail hereinafter. As will be appreciated by those skilled in the art, modular spring retainer 1 is adapted to mount a wide variety of different types of spring members 2 on an associated die plate 3, such as the coil spring 22 shown in FIG. 14, as well as other biasing mechanisms.

In the example illustrated in FIGS. 2-13, base 4 is a bolt-on mounting base that creates a flat bottom hole. The base 4 shown in FIGS. 4-9 has a substantially rectangular plan configuration, comprising vertical side and end edge surfaces 32-35, as well as horizontal faces 5 and 6. The corners of vertical side and end edge surfaces 32-35 are preferably rounded with a generally arcuate shape. The connector portion 8 of the illustrated base 4 comprises two substantially identical through apertures 36 and 37 disposed at opposite corners of base 4 and having a generally circular plan configuration with radially enlarged or countersunk outer portions 38 and 39 to receive therein the heads 40 of associated cap screws 41. The illustrated base 4 also includes a threaded aperture 42 for attaching a retainer clip 43 to the face 5 of base 4 using a threaded fastener 44 for purposes to be described in greater detail hereinafter. In the illustrated example, the central aperture 9 in base 4 has a circular plan configuration, and is substantially larger than through apertures 36 and 37. The threads on the interior surface 10 of central aperture 9 have a conventional configuration which mates with the threaded exterior of housing portion 14. In the illustrated base 4, lock dowel aperture 11 also has a circular plan shape and intersects the threaded interior surface 10 of central aperture 9, such that the width of window 12 is approximately 15 to 20 degrees in arcuate measure. The illustrated lock dowel aperture 11 extends completely through base 4 to permit removal of locking dowel pin 18.

The illustrated spring retainer 13 has an elongate, cylindrically-shaped housing portion 14, wherein the outer end is closed by end cap portion 16 and the inner end is open to receive spring member 2 telescopingly into the hollow interior 15 of housing portion 14. Preferably, the interior 15 of housing portion 14 is sized to closely receive spring member 2 therein. In the illustrated example, housing portion 14 of spring retainer 13 includes a radially extending drain hole 50 (FIG. 3) which prevents lubricants or the like from accumulating in spring retainer 13. In the example illustrated in FIGS. 2-13, end cap portion 16 has a cylindrical disk shape and is welded or otherwise fixedly mounted in the outer end of housing portion 14. In the example shown in FIGS. 7, 8 and 10, end cap portion 16 includes a central aperture 51 through which an associated threaded fastener 52 extends and is received in the threaded aperture 31 at the housing end 30 of spring member 2 to positively retain spring member 2 in spring retainer 13, as described in greater detail hereinafter.

Figure 9:
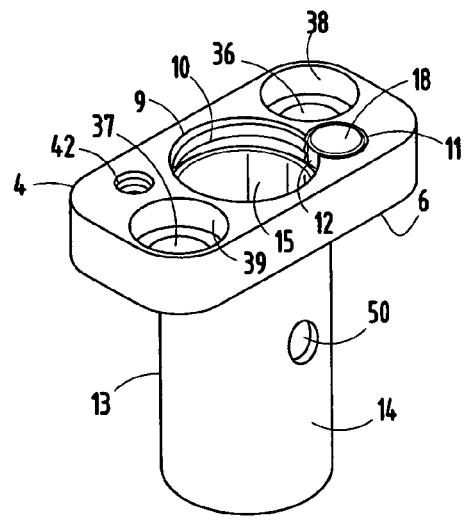
FIG. 9 is a perspective view of the modular spring retainer, with a dowel pin shown locking the spring retainer in a selected position.

As best illustrated in FIGS. 3 and 9, locking dowel pin 18 has an unthreaded exterior surface portion 19 and is closely received within lock dowel aperture 11. The unthreaded exterior portion 19 of locking dowel pin 18 protrudes through the window 12 in the central aperture 9 of base 4 and abuttingly engages an adjacent portion of the threaded exterior surface 17 of the housing portion 14 of spring retainer 13 to securely, yet detachably, retain spring member 2 in a selected longitudinal position relative to die plate 3.

Figure 8:
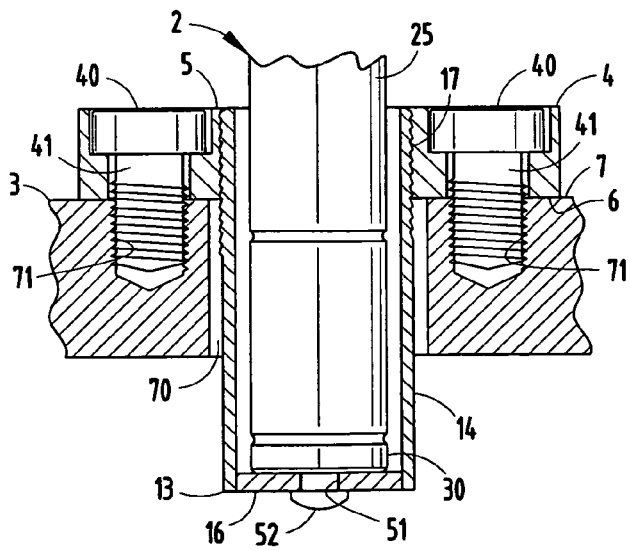
FIG. 8 is a fragmentary cross-sectional view of the modular spring retainer, shown mounted on an associated die plate.

When modular spring retainer 1 is mounted in an upper die plate 3 in the orientation illustrated in FIG. 11, spring member 2 is preferably positively, yet removably, retained in spring retainer 13 to prevent spring member 2 from falling out of die plate 3 during installation and use. As described above, the use of a spring member 2 with a threaded aperture 31 at its outer end, along with a mating threaded fastener 52, as best illustrated in FIGS. 2, 8 and 10, serves to selectively retain spring member 2 securely in place. Furthermore, a spring retaining tab or clip 43 may also be used to engage the shoulder 29 at the opposite end of spring housing 25 and thereby retain spring member 2 in place. In the example shown in FIGS. 2, 3 and 11-13, retainer clip 43 has a generally Z-shaped side elevational configuration defined by flat horizontal leg portions 45 and 46 and a vertical central body portion 47. The outer leg portion 45 includes an aperture 48 through which threaded fastener 44 extends and is in turn, anchored in the threaded aperture 42 in the face 5 of base 4. As best illustrated in FIGS. 12 and 13, the inner leg 46 of retainer clip 43 abuttingly engages the shoulder 29 on spring member housing 25 to securely, yet detachably, retain spring member 2 in place, and can be deformed during assembly to create an exact fit with spring shoulder 29.

Figure 5:
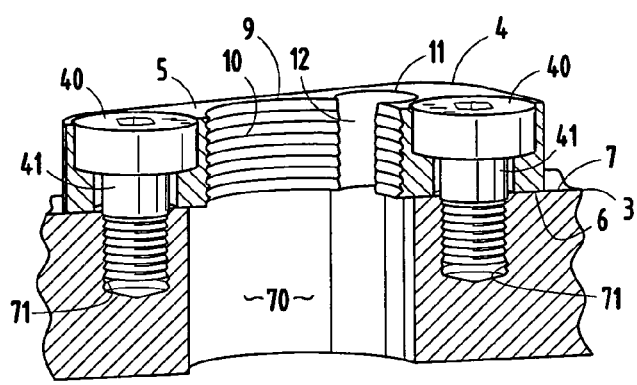
FIG. 5 is a fragmentary cross-sectional view of the modular spring retainer, shown mounted to an associated die plate, taken along the line V-V, FIG. 4.
Figure 7:
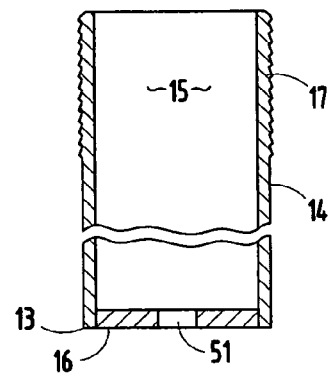
FIG. 7 is a fragmentary cross-sectional view of a spring retainer portion of the modular spring retainer.

In operation, modular spring retainer 1 is installed on die plate 3 in the following manner. With reference to FIG. 5, a non-precision clearance aperture 70 is formed completely through die plate 3 using conventional tooling. In the illustrated example, clearance aperture 70 has a generally circular plan shape. The diameter of clearance aperture 70 is significantly larger than the outside diameter of the housing portion 14 of spring retainer 13, as shown in FIG. 8, such that spring retainer 13 fits loosely in clearance aperture 70, and base 4 serves to locate spring member 2 on the die plate 3. A pair of threaded apertures 71 are then formed in the face 5 of die plate 3 in vertical alignment with the through apertures 36 and 37 of base 4. Cap screws 41 are then inserted through the apertures 36 and 37 of base 4 and anchored into the threaded apertures 71 in die plate 3 to securely, yet detachably, retain base 4 on die plate 3. The threaded inward end of housing portion 14 is then threadedly engaged into the threaded interior surface 10 of central aperture 9 in base 4 and rotated to a selected position, so as to locate spring member 2 at the desired longitudinal position relative to die plate 3. It is noteworthy that the longitudinal position of spring member 2 relative to the mounting surface 7 of die plate 3 can be adjusted in infinitesimally small increments to achieve very accurate die assembly, as well as easy maintenance and/or modification. Fastener 52 may be used to positively connect end cap 16 with the spring member 2 in the manner shown in FIG. 8, and/or retainer clip 43 can be mounted on base 4 using fasteners 43. Both retainer arrangements are particularly beneficial when modular spring retainer 1 is mounted on an upper die plate, such as the orientation illustrated in FIG. 11. The position of spring member 2 cannot move out of place due to the fact that it is positively and securely located on die plate 3 by the flat bottom hole 10 in the solid, block-shaped mounting base 4.

The reference numeral 1a (FIGS. 14-19) generally designates another embodiment of modular spring retainer 1, having a removable, quick-disconnect end cap 60. Since modular spring retainer 1 and modular spring retainer 1a have similar constructions, similar parts appearing in FIGS. 2-13 and FIGS. 14-19, respectively, are represented by the same, corresponding reference numerals, except for the suffix "a" in the numerals of the latter. As best illustrated in FIGS. 14-19, the illustrated removable end cap 60 is detachably supported in housing portion 14a, and has a circular disk-shaped construction with a circumferential end edge 61 with a radially outwardly opening groove 62 extending therealong. Furthermore, the housing portion 14a of spring retainer 13a includes a radially inwardly opening groove 63 in an interior surface at the outer end of housing portion 14a. A wire spring connector 64 is mounted in the radially outwardly opening groove 62 in end cap 60 and is selectively received in the radially inwardly opening groove 63 in housing portion 14a, as shown in FIG. 19, to detachably retain removable end cap 60 in housing portion 14a with a snap fit. The illustrated removable end cap 60 includes a pair of axially extending mounting apertures 65 through which threaded fasteners 66 are inserted and anchored into the housing end 30a of spring member 2a to positively retain spring member 2a in spring retainer 13a. Removable end cap 60 permits both the end cap 60 and the associated spring member 2a to be easily inserted into and/or removed from the associated housing portion 14a of spring retainer 13a by hand, without requiring the use of tools.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a metal forming die of the type having first and second die plates mounted in a spaced apart relationship for mutual reciprocation between converged and diverged positions, and a spring member disposed operatively between said first and second die plates for biasing the same to said diverged position, the improvement of a modular spring retainer detachably mounting said spring member on said first die plate, comprising:

a base having a first face, a second face shaped to abut an adjacent face of said first die plate, a connector portion for detachably mounting said base to said first die plate, a central aperture extending axially through said base and including a threaded interior surface, and a lock dowel aperture extending axially through said first face of said base at a location laterally adjacent to said central aperture such that said lock dowel aperture forms a window through said threaded interior surface of said central aperture and communicates with said central aperture;

an elongate, cylindrically-shaped spring retainer having a housing portion with a hollow interior closely receiving said spring member therein, an end cap portion abuttingly supporting thereon an associated end of said spring member, and a threaded exterior portion which threadedly engages said threaded interior surface of said central aperture in said base, whereby rotation of said spring retainer relative to said base adjusts the longitudinal position of said spring member with respect to said first die plate; and a locking dowel pin closely received in said lock dowel aperture in said base and having an unthreaded exterior surface portion thereof which protrudes through said window in said central aperture of said base and abuttingly engages an adjacent portion of said threaded exterior surface of said spring retainer to securely, yet detachably, retain said spring member in a selected longitudinal position relative to said first die plate.

2. A metal forming die as set forth in claim 1, wherein:
said end cap portion is detachably supported in said housing portion.

3. A metal forming die as set forth in claim 2, wherein:
said end cap portion comprises a disk-shaped plug having a circumferential end edge with a radially outwardly opening groove extending therealong;
said housing portion includes an outer end thereof with a radially inwardly opening groove in an interior surface thereof; and including
a spring connector mounted in said radially outwardly opening groove in said plug and selectively received in said radially inwardly opening groove in said housing portion to detachably retain said plug in said housing portion with a snap fit.

4. A metal forming die as set forth in claim 3, wherein:
said first die plate includes a clearance aperture extending therethrough having a lateral width substantially greater than the lateral width of said spring retainer, such that said spring retainer fits loosely in said clearance aperture, and said base locates said spring member on said first die plate.

5. A metal forming die as set forth in claim 4, wherein:
said base comprises a base block having at least one mounting aperture extending axially therethrough to define at least a portion of said connector portion of said base; and including
a fastener extending through said mounting aperture in said base, and detachably anchored in said first die plate.

6. A metal forming die as set forth in claim 5, wherein:
said lock dowel aperture comprises a precisely formed, reamed bore which extends completely through said base, and is sized for a tight friction fit with said locking dowel pin.

7. A metal forming die as set forth in claim 6, wherein:
said locking dowel pin is configured to be removed from said lock dowel aperture in said base to permit rotation of said spring retainer for adjusting the longitudinal position of said spring member relative to said first die plate.

8. A metal forming die as set forth in claim 7, wherein:
said spring retainer is can-shaped with an open first end through which said spring member is received, an opposite second end closed by said end cap, and a generally continuous sidewall extending therebetween.

9. A metal forming die as set forth in claim 8, wherein:
said spring member comprises a gas spring.

10. A metal forming die as set forth in claim 8, wherein:
said spring member comprises a coil spring.

11. A metal forming die as set forth in claim 9, wherein:
said spring member includes a housing portion thereof retained in said spring retainer, and a rod portion thereof extending outwardly toward said second die plate; and including
a spring retaining tab having a first portion thereof operatively connected with said base, and a second portion thereof engaging said housing portion of said spring member to positively retain said spring member in said spring retainer.

12. A metal forming die as set forth in claim 10, including:
a fastener detachably connecting said first portion of said spring retaining tab with said base.

13. A metal forming die as set forth in claim 12, including:
at least one fastener extending through said end cap in said second end of said spring retainer and connected with said associated end of said spring member to positively retain said spring member in said spring retainer.

14. A metal forming die as set forth in claim 13, wherein:
said spring retaining tab has a generally Z-shaped side elevational configuration with a generally flat bottom leg portion thereof detachably connected with said base, and a generally flat top leg portion thereof abutting an adjacent end of said housing portion of said spring member.

15. A modular spring retainer for metal forming dies of the type having first and second die plates mounted in a spaced apart relationship for mutual reciprocation between converged and diverged positions, and a spring member disposed operatively between the first and second die plates for biasing the same to the diverged position, comprising:
a base having a first face, a second face shaped to abut an adjacent face of the first die plate, a connector portion for detachably mounting said base to the first die plate, a central aperture extending axially through said base and including a threaded interior surface, and a lock dowel aperture extending axially through said first face of said base at a location laterally adjacent to said central aperture such that said lock dowel aperture forms a window through said threaded interior surface of said central aperture and communicates with said central aperture;
an elongate, cylindrically-shaped spring retainer having a housing portion with a hollow interior shaped for closely receiving the spring member therein, an end cap portion configured to abuttingly support thereon an associated end of the spring member, and a threaded exterior portion which threadedly engages said threaded interior surface of said central aperture in said base, whereby rotation of said spring retainer relative to said base adjusts the longitudinal position of the spring member with respect to the first die plate; and
a locking dowel pin closely received in said lock dowel aperture in said base and having an unthreaded exterior surface portion thereof which protrudes through said window in said central aperture of said base and abuttingly engages an adjacent portion of said threaded exterior surface of said spring retainer to securely, yet detachably, retain the spring member in a selected longitudinal position relative to the first die plate.

16. A modular spring retainer as set forth in claim 15, wherein:
said end cap portion is detachably supported in said housing portion.

17. A modular spring retainer as set forth in claim 16, wherein:
said end cap portion comprises a disk-shaped plug having a circumferential end edge with a radially outwardly opening groove extending therealong;
said housing portion includes an outer end thereof with a radially inwardly opening groove in an interior surface thereof; and including
a spring connector mounted in said radially outwardly opening groove in said plug and selectively received in said radially inwardly opening groove in said housing portion to detachably retain said plug in said housing portion with a snap fit.

18. A modular spring retainer as set forth in claim 17, wherein:
said base comprises a base block having at least one mounting aperture extending axially therethrough to define at least a portion of said connector portion of said base; and including
a fastener extending through said mounting aperture in said base, and detachably anchored in said first die plate.

19. A modular spring retainer as set forth in claim 18, wherein:
said lock dowel aperture comprises a precisely formed, reamed bore which extends completely through said base, and is sized for a tight friction fit with said locking dowel pin.

20. A modular spring retainer as set forth in claim 19, wherein:
said locking dowel pin is configured to be removed from said lock dowel aperture in said base to permit rotation of said spring retainer for adjusting the longitudinal position of said spring member relative to said first die plate.

21. A modular spring retainer as set forth in claim 20, wherein:
said spring retainer is can-shaped with an open first end through which said spring member is received, an opposite second end closed by said end cap, and a generally continuous sidewall extending therebetween.

22. In a method for making a metal forming die of the type having first and second die plates mounted in a spaced apart relationship for mutual reciprocation between converged and diverged positions, and a spring member disposed operatively between the first and second die plates for biasing the same to the diverged position, the improvement comprising:
forming a base with a first face, a second face shaped to abut an adjacent face of the first die plate, a connector portion for detachably mounting the base to the first die plate, a central aperture extending axially through the base and including a threaded interior surface, and a lock dowel aperture extending axially through the first face of the base at a location laterally adjacent to the central aperture such that the lock dowel aperture forms a window through the threaded interior surface of the central aperture and communicates with the central aperture;
positioning the second face of the base abuttingly against the adjacent face of the first die plate;
detachably, yet securely, connecting the base with the first die plate;
forming an elongate, cylindrically-shaped spring retainer having a housing portion with a hollow interior closely receiving the spring member therein, an end cap portion abuttingly supporting thereon an associated end of the spring member, and a threaded exterior portion;
threadedly engaging the threaded exterior portion of the spring retainer with the threaded interior surface of the central aperture in the base, whereby rotation of the spring retainer relative to the base adjusts the longitudinal position of the spring member with respect to the first die plate;
forming a locking dowel pin with an unthreaded exterior portion; and
inserting the locking dowel pin in the lock dowel aperture in the base, such that the unthreaded exterior surface portion of the locking dowel pin protrudes through the window in the central aperture of the base and abuttingly engages an adjacent portion of the threaded exterior surface of the spring retainer to securely, yet detachably, retain the spring member in a selected longitudinal position relative to the first die plate.

23. A method as set forth in claim 22, including:

detachably mounting the end cap portion in the housing portion.

24. A method as set forth in claim 23, including:

forming the end cap portion in the shape of a disk-shaped plug with a circumferential end edge having a radially outwardly opening groove extending therealong;

forming an outer end of the housing portion with a radially inwardly opening groove in an interior surface thereof; and inserting a spring connector mounted in the radially outwardly opening groove in the plug and the radially inwardly opening groove in the housing portion to detachably retain the plug in the housing portion with a snap fit.

25. A method as set forth in claim 24, including:

forming a clearance aperture through the first die plate with a lateral width substantially greater than the lateral width of the spring retainer, such that the spring retainer fits loosely in the clearance aperture, and the base locates the spring member on the first die plate.

* * * * *